United States Patent [19]
Eisenberg

[11] 3,743,754
[45] July 3, 1973

[54] LORAN SIGNAL SYNTHESIZER

[75] Inventor: Robert M. Eisenberg, Derwood, Md.

[73] Assignee: The Singer Company, Binghamton, N.Y.

[22] Filed: Sept. 1, 1971

[21] Appl. No.: 176,802

[52] U.S. Cl. .................. 35/10.2, 307/262, 328/59, 340/352, 343/103
[51] Int. Cl. ............................................. G09b 9/02
[58] Field of Search .................. 35/10.2, 10.4; 343/103; 340/348, 352, 354; 328/37, 59, 48; 307/262

[56] References Cited
UNITED STATES PATENTS

| | | | |
|---|---|---|---|
| 3,335,404 | 8/1967 | Wood | 340/348 |
| 3,657,658 | 4/1972 | Kubo | 328/37 X |
| 3,521,185 | 7/1970 | Ley | 328/59 X |
| 2,835,888 | 5/1958 | Frank | 343/103 |
| 3,079,601 | 2/1963 | Carter et al. | 343/103 |
| 3,201,687 | 8/1965 | Pasquier et al. | 343/103 X |
| 3,517,108 | 6/1970 | McCarthy | 35/10.2 |
| 3,577,084 | 5/1971 | Atcherson | 328/37 X |

Primary Examiner—Felix D. Gruber
Attorney—Francis L. Masselle et al.

[57] ABSTRACT

This specification describes a Loran simulator for simulating both type A and type C Loran signals. A pulse generator for generating Loran C pulse trains is driven from a counter. The counter has timing pulses supplied to it from a clock. The output of the counter, when a prescribed count is reached, triggers the generation of the Loran C pulses. In addition, the Loran A pulse generator is triggered by an output of the Loran C generator. Separate output terminals are provided for each type of Loran pulse trains. A control device supplies the counter at the beginning of each cycle with a number whose value determines the time interval until the generation of the next pulse train. The control device may be manually operable or automatically operated. Radio frequency phasing effects are also generated.

9 Claims, 6 Drawing Figures

LORAN SIGNAL SYNTHESIZER

This invention relates to training devices, and more particularly to devices for training students in the operation of navigation equipment.

Loran's primary function is to provide both airborne and surface vehicles with accurate information of their present positions over the face of the earth. Loran is a pulsed, hyperbolic, long-range, navigation aid. At present, there are two types of Loran systems in use: Loran A and Loran C. Both types of systems comprise radio transmitters permanently situated at locations on the earth's surface which are precisely known. In Loran A, radio transmitters are operated in pairs with both transmitters of a pair operating at the same radio frequency and having the same pulse repetition rate. A Loran A receiver may have in its range at any time a plurality of such pairs of transmitters. The receiver is selectively tuned to one of the transmitter frequencies, and a display device on the receiver displays the received pulses. The pulses of the two transmitters to which the receiver is tuned remain in fixed positions on the display device while the pulses received from transmitters operating at slightly different pulse repetition rates drift across the display device. Delay means within the receiver itself are adjusted to align the two stationary pulses. The amount of adjustment required to align these pulses is a measurement of the time difference in the reception of those two pulses. When all of the points at which pulses from the two transmitters of a pair are received with the same time difference are plotted, a hyperbola is formed. The procedure outlined above is repeated for pulses from a second pair of transmitters, and a second hyperbola is defined. Where the two hyperbolas intersect is the location of the receiver.

As a practical matter, one transmitter of a pair is a master transmitter and the other is a slave. The transmission of a pulse of radio frequency energy from the master transmitter triggers the generation of a pulse by the slave transmitter. In a practical application of this system, known fixed-delays are introduced between the transmission of a pulse by the master and the transmission of a pulse by the slave. Since these delays are known and are fixed, they are automatically compensated for in the receiver when the time difference measurement is made. The individual transmitter pairs are identified by the frequency of the radio transmission and by the pulse repetition rate. By using these two characteristics, the pulses from each pair of transmitters can be readily identified. The transmitter locations are accurately shown on charts, which also accurately display families of hyperbolas defining equal time differences of reception of signals of two transmitter of a pair. From these charts, a navigator can readily compute his location.

In Loran C, a single master transmitter may control a plurality of slave transmitters up to four in number. The master transmitter transmits a train of eight pulses which are 1 millisecond apart and a ninth pulse which is spaced 2 milliseconds from the eighth pulse. Each of the slave transmitters transmits only the first eight pulses. The transmission of each slave transmitter is delayed for a prescribed period of time after the transmission of the master signal so that the space between two master transmissions is occupied by the transmissions of the four slave transmitters. The sequence of transmission is known and fixed so that each of the slaves which belong to a master is readily identified by the position its transmission occupies in the train of transmissions. Each group of master and slaves has its own assigned pulse repetition rate so that the group of master and slave transmitters can be identified by the pulse repetition rate, the master transmission can be identified by the ninth pulse, and each of the slave transmissions can be identified by its position in the train of transmissions. The physical location on the face of the earth of each of the master and slave transmitters is accurately known, so that a navigator using a Loran C receiver and the technique set forth above in the description of the Loran A operation can locate his position by using any two pairs of Loran C transmissions from the same group of master and slaves. Since, for any group of master and slaves, both the frequency of transmission and the pulse repetition rate are the same, there are fewer receiver adjustments to be made, and a more rapid determination can be made.

Originally, when aligning a pair of Loran pulses, the leading or trailing edges of the pulses were aligned. This provides a suitable means for determining the location of surface bound ships, but it is not sufficiently accurate to provide a reading for rapidly moving aircraft. Since each pulse comprises a burst of radio frequency energy, Loran C receivers are provided with means for aligning individual cycles of the radio frequency energy of two separate pulses. This provides much more accurate timing difference determination. To provide a means for identifying not only the individual pulses but also the appropriate cycles within the pulses, each of the pulse transmissions in Loran C is polarity coded. The first half-cycle for each pulse of a train of nine pulses generated by the master transmitter is assigned a prescribed polarity. Thus, by way of example, the first pulse generated by the master transmitter may start with a positive half-cycle, the second pulse may start with a positive half-cycle, the third pulse may start with a negative half-cycle, the fourth pulse may start with a negative half-cycle, the fifth pulse may start with a positive half-cycle, the sixth pulse may start with a negative half-cycle, the seventh pulse may start with a positive half-cycle, and the eighth pulse may start with a negative half-cycle. On the next transmission from the master transmitter, the polarities of the individual eight pulses may be different so that the master is provided with two different codings for its pulse transmissions. The generation of pulses by the slave transmitters is also encoded in a similar manner with two separate codes which are different from the two codes used by the master. In each case, the two codes are alternated for alternate transmissions. This coding provides a ready means for identifying corresponding transmissions of a master and a slave and also for identifying the individual pulses within a train of pulses. By this means, a navigator can accurately align the individual cycles of the same pulses from two different transmitters.

It is an object of this invention to provide a new and improved training device.

It is another object of this invention to provide a new and improved navigational training device.

It is a further object of this invention to provide a new and improved electronic system.

It is still another object of this invention to provide a new and improved electronic simulator.

It is still another object of this invention to provide a new and improved electronic simulator device.

Other objects and advantages of this invention will become more apparent as the following description proceeds, which description should be considered together with the accompanying drawings in which.

Figure 1:
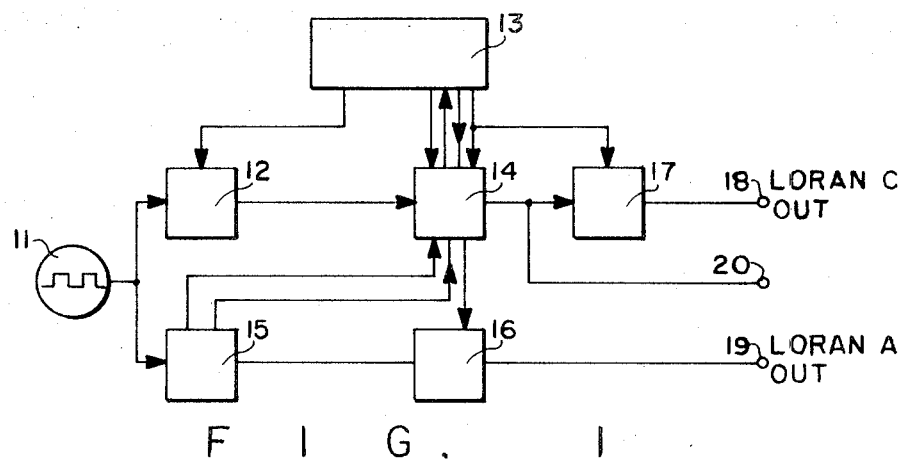
FIG. 1 is a general overall block diagram of the trainer of this invention.

Referring now to the drawings in detail and more particularly to FIG. 1, the reference character 11 designates a high frequency clock whose output feeds a counter 12 and a frequency divider 15. The counter 12 is connected to a control device 13 by which it may be loaded in parallel and its output is connected to an input of a Loran C generator 14. The Loran C generator 14 has a plurality of inputs and outputs. At least one input to the generator 14 is connected to an output of the control device 13, and, at least one output of the Loran C generator 14 is connected to an input of the control device 13. An information output from the Loran C generator 14 is connected to an output terminal 20, and a second information output from the generator 14 is connected to an input of a phase coding device 17. The output from the phase coding device 17 is connected to an output terminal 18, and another input to the coding device 17 comes from the control device 13. The frequency divider 15 provides a plurality of outputs to the Loran C generator 14 and also an output to a Loran A generator 16. The Loran A generator 16 receives an input signal from the Loran C generator 14 and provides output information to an output terminal 19.

In operation, the Loran C generator generates the pulses which comprise Loran C pulse trains at selected time intervals. The time intervals are determined initially by the control device 13. The control device 13 will be described in greater detail below, but it can be indicated at this point that this device can comprise any of a plurality of structures. In one form of the system which is suitable for classroom training to provide students with a working knowledge of the Loran A and Loran C equipment, the control device 13 can be a panel board which comprises a large number of manually adjustable switches. An instructor or operator selects the appropriate delays from navigation charts, converts the delays into equivalent numbers and inserts these numbers into the system by operation of the appropriate switches. On the other hand, the control device 13 can comprise a general-purpose computer programmed to perform navigational computations and to provide the system of FIG. 1 with delay numbers appropriate thereto, or a special-purpose computer designed to perform automatically a prescribed sequence of computations which can provide the system of FIG. 1 with either a fixed or random series of time interval numbers can comprise the control device 13. In the system of FIG. 1 the time interval information from the control device 13 is in the form of a binary number which is loaded into the counter 12. This provides the counter 12 with a datum or a base value from which it can start counting. The counter 12 counts the pulses supplied to it from the clock 11. The counter 12 can be either a down-counting counter, in which case the number supplied to the counter 12 from the control device 13 represents the actual interval, or it may be an up-counting counter, in which case the number supplied by the control device 13 is the complement of the time interval. In either case, when the counter 12 has counted either to zero or to overflow, it generates an output signal which is applied to the input of the Loran C generator 14. When this occurs, the Loran C generator 14 generates its train of output pulses. These pulses are supplied directly to the output terminal 20 and also to an input of the phase coding device 17. The output of the phase coding device 17, which appears at the output terminal 18, comprises the same information that is supplied to the terminal 20 with the appropriate polarity coding added. The Loran C generator 14 generates a train of pulses which represents a single transmission of a single transmitter at any time. The time interval between that generation and the generation of the train of pulses for the next transmission is determined by the value of the number loaded into the counter 12. Thus, each time interval between each generation of pulses which represents a transmission from each of the transmitters requires a separate word from the control device 13. During the time that the Loran C generator 14 is generating a train of pulses, the counter 12 is being loaded with the next word from the control device 13. To accomplish this, when the Loran C generator 14 receives its signal from the counter 12, it applies a signal to the control device 13 indicating that it is time to reload the counter 12. Once the counter 12 is loaded it can again begin counting for the next time interval after the Loran C generator 14 has finished generating its train of pulses. In addition, information supplied from the control device 13 to the Loran C generator 14 indicates to the generator whether a particular train of pulses being generated represents the transmission from a master or from a slave so that the appropriate number of pulses will be supplied.

The clock 11 operates at a high rate to provide the counter 12 with the desired precision. The smallest increment of time provided by the counter 12 should be comparable to the smallest interval of time which the receiver is capable of measuring. To provide proper timing for the 1 KHz pulses requires that the output from the clock 11 be stepped down in frequency. This is accomplished by the frequency divider 15 which supplies to the Loran C generator 14 pulses of the proper timing. In addition, the frequency divider 15 provides the Loran A generator 16 with pulses of the right frequency for the generation of the Loran A signals. The Loran A pulses are multiple pairs of pulses separated by suitable time intervals. As accomplished for Loran C, the determination of the suitable timing intervals between the generation of Loran A signals is made by the counter 12, and the application of the signal output from the counter 12 to the Loran C generator 14 also supplies a signal for the generation of the Loran A pulses to the Loran A generator 16. The output from the Loran generator 16 appears at the output terminal 19.

To summarize the operation of the system of FIG. 1, it should be recalled that information which determines the time intervals between the generations of appropriate Loran A and Loran C pulses originates with digital words supplied either manually or automatically from the control device 13 to the counter 12. These words become time intervals by the time required for the counter 12 to count a sufficient number of clock pulses from the clock 11 to reach its capacity. When an output from the counter 12 is generated, the Loran C generator 14 or the Loran A generator 16 as determined by the appropriate control signal from the control device 13, generates the next output pulse. This procedure is repeated with the time intervals between successive pulse trains being selectable by the control device 13.

Figure 2:
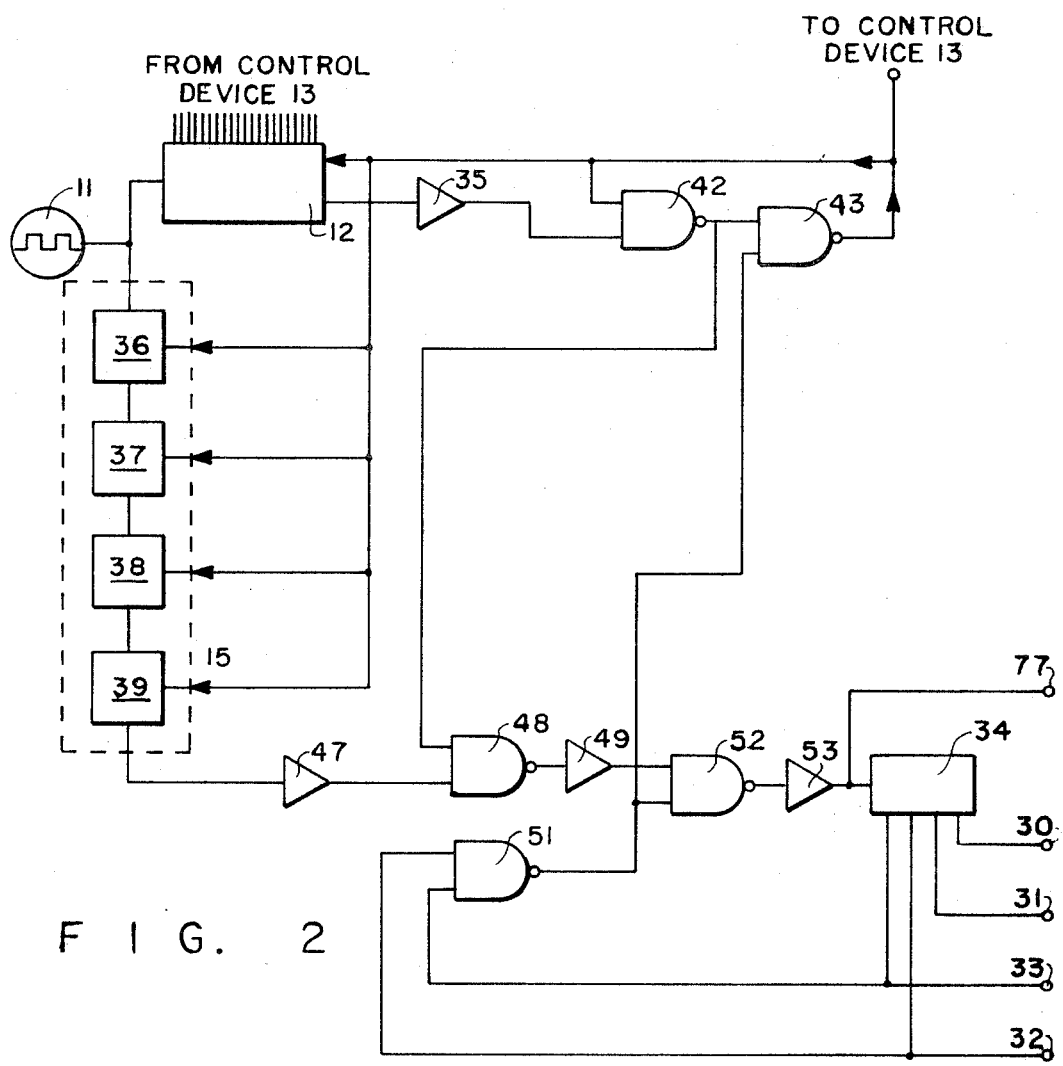
FIGS. 2 and 3 are logical block diagrams of portions of the Loran C control system of the system of FIG. 1.

FIG. 2 shows in logical block form details of a portion of the Loran C generator 14. The clock 11 supplies clock input pulses to the counter 12, which is shown here as a 20-place counter. The output from the clock 11 also feeds the frequency divider 15 which is shown as four divide-by-10 devices 36, 37, 38, and 39 connected in series. The output from the last divide-by-10 device 39 is applied through an inverter 47 to one input of a NAND gate 48. The output from the gate 48 is applied through an inverter 49 to one input of a NAND gate 52. The output from the gate 52 is applied through an inverter 53 to an output terminal 77 and also to the count input of a four-place counter 34. Outputs are taken from each of the four stages of the counter 34 with the $2^0$ output being applied to an output terminal 30, the $2^1$ output being applied to an output terminal 31, the $2^2$ output being applied to an output terminal 32 and as one input to a NAND gate 51, and the $2^3$ output being applied to an output terminal 33 and as the other input to the gate 51. The output from the gate 51 is applied as the other input to the gate 52 and also as one input to a NAND gate 43. The output from the gate 43 is applied to the control device 13, as a control input to the counter 12 and also as one input to a NAND gate 42. The other input to the NAND gate 42 comes from the zero output from the counter 12 through an inverter 35. The output from the gate 42 is applied as the other input to the NAND gate 48. In addition, individual enable inputs to each of the four divide-by-10 devices 36–39 are connected to the output of the NAND gate 43.

As explained above, a word is loaded into the counter 12 from the control device 13, and the counter 12 begins to count the pulses coming from the clock 11 when a high signal appears at its control input. When the contents of the counter 12 equal zero, the output goes high. Gates 42 and 43 form a latch circuit. Normally, the output from the inverter 35 is high, applying a high input to the gate 42. If either input to a NAND gate is low, it produces a high output. When the counter 12 reaches zero and its output goes high, the output from the inverter 35 goes low. This produces a high output from the gate 42. Normally, the output from the gate 51 will be high since the only time it goes low is when both of its inputs are high. This applies two high inputs to the gate 43 causing its output to go low. At this point, both inputs to the gate 42 are low so that even though the condition of the counter 12 changes, the states of the two gates 42 and 43 remain as they are with the output of the gate 42 high and the output of the gate 43 low. This action stops the counter 12 and reloads the counter with the delay word. Once the counter 12 is reloaded, the output from the inverter 35 goes high. The only time that the gate 51 produces a low output signal is when both of its inputs are high;

and, since the two inputs to the gate 51 come from the $2^2$ and $2^3$ outputs from the counter 34, when the counter 34 reaches a count of 10, the output from the gate 51 goes low, one input to the gate 43 goes low, and its output goes high. This applies a second high input to the gate 42 causing its output to go low, holding the gate 43 with a high output. Thus, we have the latch circuit formed of gates 42 and 43 changing condition when the counter 12 reaches zero-this is the signal to begin generating Loran C pulses-and again changing condition when the counter 34 indicates that ten such pulses have been generated. This is the mechanism by which the Loran C generator assures the system that only 10 pulse positions are available for any Loran C pulse train. The output from the gate 43, in one condition, is applied as a load control signal which indicates to both the control device 13 and to the counter 12 that a new word is to be loaded into the counter 12, and it prevents counter 12 from counting until after ten pulses have been generated. The pulses which form the Loran C pulse train are pulses which are supplied from the output of the divide-by-10 device 39. The output passes through the inverter 47 and is supplied as one input to the gate 48. So long as the output from the gate 42 is low, no pulses will pass through that gate. The output of the gate 42 is low during that time when the counter 12 is counting and the gate 42 output goes high only when the counter 12 has counted to zero. Thus, although an output is supplied from the device 39 continually, it passes through the gate 48 only between the times that the counter 12 generates an output signal and the counter 34 has counted to 10. The output of the gate 48 changes when ever both inputs go high. Since the output from the gate 51 is high at all times, other than when the counter 34 reaches a count of 10, the output pulses from the inverter 49 pass through the gate 52 and the inverter 53 and are applied to the count input of the counter 34. These pulses also are applied to the output terminal 77. The counter 34 counts the pulses passing through the inverter 53 and the output terminals 30–32 are sequentially energized in accordance with the contents of the counter 34 as the count proceeds. The pulse clock generator 11 generates pulses at the rate of 10 MHz. The output from the divide-by-10 device 36 is 1 MHz. The output from the divide-by-10 device 37 is 100 KHz. The output from the divide-by-10 device 38 is 10 KHz, and the output from the divide-by-10 device 39 is 1 KHz. Thus, pulses are applied to the counter 34 and to the terminal 77 at the rate of 1,000 per second. Pulses are permitted to pass through this network for 10 milliseconds only. This results in 10 output pulses, and the desired pulses are selected from these 10 elsewhere in these circuits.

The apparatus shown in FIG. 2 generates a train of 10 pulses at the rate of 1 KHz which are applied to the output terminal 77. The apparatus shown in FIG. 3 controls those pulses to produce the desired Loran C pulse train. The pulses from the inverter 53 are applied to the input terminal 77 of FIG. 3. Terminal 77 is connected as one input to a NAND gate 54, the output of which is applied through an inverter 55 to one input of a NAND gate 56. The output of the gate 56 is applied through an inverter 57 as one input of a NAND gate 69, whose output is applied through an inverter 71 to one input of a NAND gate 72. The output of the gate 72 is applied through an inverter 73 as one input to a NAND gate 74, whose output is applied through an inverter 75 to the output terminal 20. The other input to the gate 54 comes from the output of a NAND gate 59. The gate 59 has two inputs-one is the $2^0$ input applied by counter 34 to terminal 30 and applied by terminal 30 through an inverter 58 to one input of the gate 59, and the other input is the $2^3$ count from the counter 34 applied to the terminal 33 and directly to the other input of the gate 59. The terminal 33 is also connected directly to one input of a NAND gate 62, whose output is applied to the other input of the gate 56. The other input to the gate 62 comes from the output of a NAND gate 61, which has one input connected to an input terminal 25 which is connected to the control device 13 for receiving the "Master Blink" signal from the control device 13. A pair of terminals 26 and 28 are connected to the control device 13 to receive the "Load" and the "$\overline{\text{Load}}$" signal therefrom when the device 13 receives the signal output from the counter 12. A terminal 27 is connected to the control device 13 to receive the "Master Set" signal. The terminals 26 and 27 are connected as the two inputs to a NAND gate 44 the output of which is connected as one input to a NAND gate 45. The output of the gate 45 is connected to the other input of the gate 61 and as one input to a NAND gate 46. The output of the gate 46 is connected to the other input of the gate 45. The other input to the gate 46 is connected to the terminal 28. The $2^1$ count and the $2^2$ count from the counter 34 is applied to the terminals 31 and 32 respectively. Terminal 31 is connected through an inverter 63 as one input to a NAND gate 64, and terminal 32 is connected through an inverter 65 as the other input to the gate 64. The output from the gate 64 is applied through an inverter 67 as one input to a NAND gate 68, the output of which is connected to the other input of the gate 69. Terminal 29 is connected to the control device 13 to receive a "Slave Malfunction" signal therefrom and is also connected to the other input to the gate 68. An input terminal 40 receives a 2 KHz signal and applies it through inverter 66 to the other input of the gate 72. A terminal 41 receives a 250 microsecond pulse which it applies to the other input to the gate 74.

The train of 10 pulses which is generated by the equipment shown in FIG. 2 is applied as the input to a train of NAND gates which are connected in series. Since the NAND gates invert their signals, inverters are inserted between them. However, if AND gates are used, the inverters may be eliminated. In this train of gates, each gate is used to control one or more aspects of the 10 pulses in the train. Both the master and the slave transmitters transmit eight pulses which are 1 millisecond apart. The master also transmits a ninth pulse spaced 2 milliseconds from the eighth pulse. The ninth pulse that is transmitted by the master is in the tenth pulse position in the train of 10 pulses. Therefore, for transmissions of both the master and the slave, the ninth pulse must be suppressed at all times. For transmissions from the slaves, the tenth pulse is also suppressed. The count of nine is formed in the counter 34 by a high pulse on terminal 30 and a high pulse on terminal 33. The counter 34, as is true of most such counters, produces its number count after that particular pulse has already occurred. This means, for example, that the counter 34 produces the output signals which indicate the count of nine after the ninth pulse is already in existence. If the ninth pulse is to be suppressed, it must be suppressed by the count of eight output from the counter 34. This, the $2^3$ count from the counter 34 which is applied to the terminal 33 is directly applied to the input of the gate 59, whereas the $2^0$ count is applied to the other input of the gate 59 through an inverter 58. This means that when the counter 34 reaches a count of eight, both of the inputs to the gate 59 are high, and its output is low, producing a high output from the gate 54 which, when passed through the inverter 55, produces a low input to the gate 56, effectively prohibiting the flow of pulses therethrough during that interval. Thus, the count of eight in the counter 34 suppresses the next pulse. Since, the tenth pulse is required for the master pulse train generation, the inhibition on the gates 54 and 56 must be removed after the ninth pulse has been suppressed. This is accomplished by applying the $2^0$ output from the counter 34 to the input of the gate 59 through the inverter 58. As the counter 34 counts the ninth pulse, the $2^3$ input to the gate 59 remains high but the $2^0$ input goes low. This produces a high output from the gate 59 opening the gate 54 to the passage of pulses therethrough. The $2^3$ output from the counter 34 is also directly applied as one input to the gate 62. Therefore, during the counts of eight, nine, and 10, one input to the gate 62 is high. The gates 45 and 46 form a latch and operate in the manner similar to that explained above for the gates 42 and 43. The Load input to terminal 26 and the Master Set input to terminal 27 are high pulses. When those two signals go high, both inputs to the gate 46 are high and its output is low. This drives the output of the gate 45 high providing one high input to the gate 46 and a high input to the gate 61. The input terminal 25 is normally high, so that when gate 61 has the two high inputs, its output is low driving the output from the gate 62 high. This permits the gate 56 to transmit pulses. Should the Master Set signal not be present on terminal 27, then that input to the gate 44 is low, its output is high, and the output from the gate 45 is low. This drives the output from the gate 61 high so that during the eighth, ninth, and tenth counts from the counter 34, the output from the gate 62 is low effectively blocking the transmission of the ninth and tenth pulses through the gate 56. From this it can be seen that the tenth pulse is permitted to pass through the gate 56 only when the Master Set signal is high on the terminal 27. However, should the Master Set signal be high on the terminal 27 and the Master Blink signal on the terminal 25 be low, then the gate 61 has a high output driving the output of the gate 62 low during the counts of eight, nine, and ten. This also effectively blocks the transmission of the tenth pulse through the gate 56. As explained above, the load signal applied to the terminal 26 is normally high, making the $\overline{\text{Load}}$ signal applied to the terminal 28 normally low. When both inputs to the gate 44 are high, its output is low, driving the output from the gate 45 high. Gate 46 has one high input. However, since the $\overline{\text{Load}}$ signal on terminal 28 is low, at that time the output from the gate 46 is driven high. When the Load and $\overline{\text{Load}}$ signals change, terminal 26 goes low and terminal 38 goes high. This applies a second high signal to the gate 46 driving its output low. At the same time it removes one of the high input signals from the gate 44 permitting its output to go high. This applies two high inputs signals to the gate 45 driving its output low and ensuring a high output signal from the gate 46. That condition remains until the Master Set signal decays applying a low input to the gate 44 and keeping the latch of the gates 45 and 46 in its present condition until the Master Set signals again appears. Therefore, once the Master pulse train has been generated, it is not again generated until the next Master Set signal arrives at the terminal 27 from the control device 13.

Figure 3:
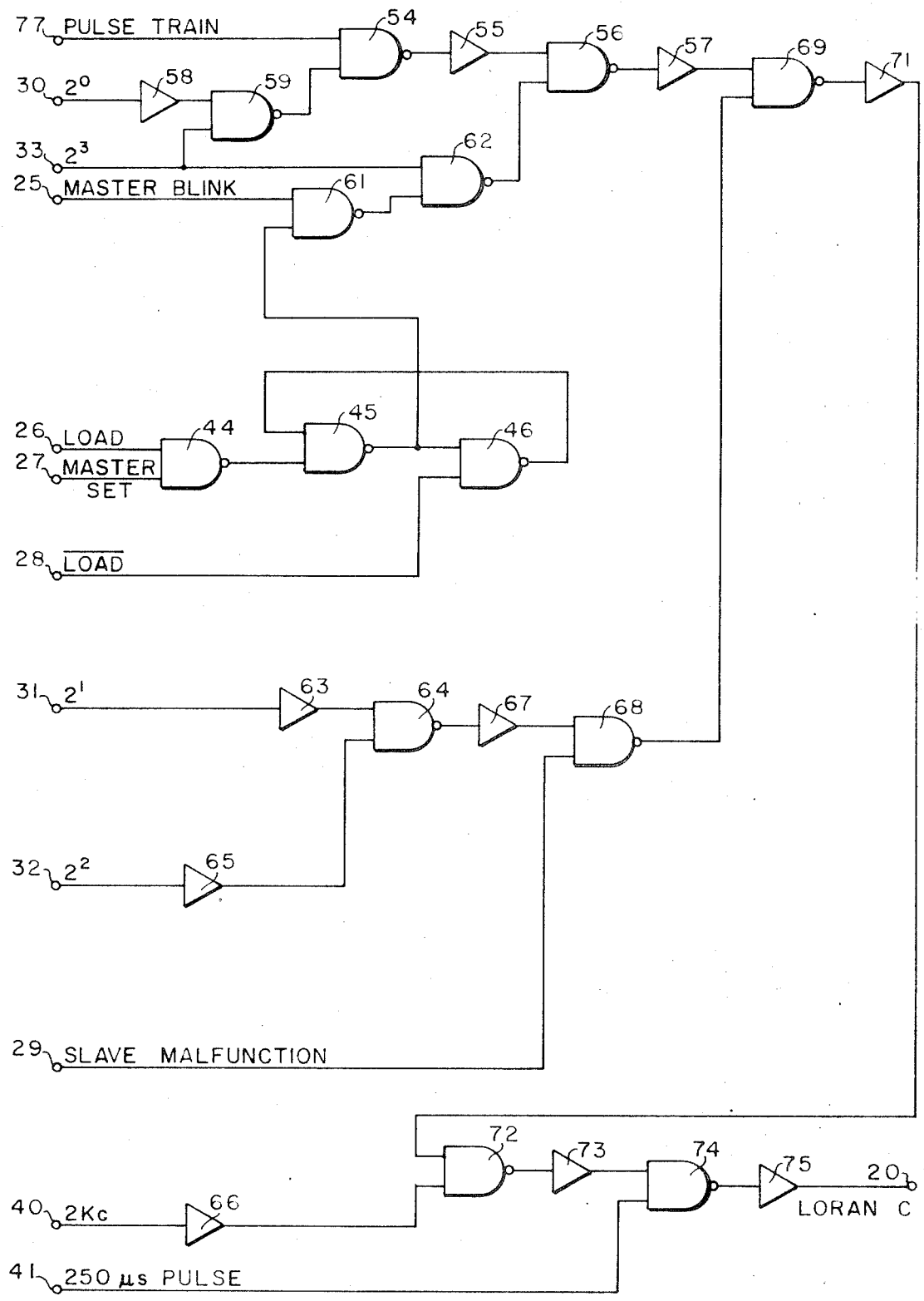

In Loran C systems, the malfunction of a slave transmitter is indicated by the flashing or blinking of the first two signals. In the systems of FIG. 3, this is accomplished by inhibiting the transmission of pulses through the gate 69 at appropriate times. The count output of the first two pulses from the counter 34 is one and two. Since the inhibition must be accomplished during the time interval prior to the appearance of that count on the counter 34, inhibition of the first count must be accomplished during the count of zero, and inhibition of the second pulse must be accomplished during the count of one. The count of zero could also be the count of 10, or any count utilizing the $2^3$ stage. The count of one uses only the $2^0$ stage. Therefore, this inhibition is accomplished by taking the output from $2^1$ stage and $2^2$ stage of the counter 34, inverting those outputs so that they are low and applying them as the inputs to the gate 64. The low output from the gate 64 is inverted through the inverter 67 to apply a high input to the gate 68. When a Slave Malfunction signal drives the terminal 29 high, the gate 68 has two high inputs applied to it and its output goes low, effectively inhibiting gate 69. As soon as the counter 34 counts the first pulse, the terminal 31 goes high, driving the output of the gate 64 high and driving the output of the gate 68 high. So that once the first two pulses have been generated, the Salve Malfunction signal no longer inhibits the gate 69. The train of pulses representative of the Loran C pulses are pulses of short duration on 1 millisecond centers. To ensure the generation of these short pulses, gates 72 and 74 are used to shorten the pulses passing through the line of gates. Two kilocycle/sec. signals are inverted by the inverter 66. A 2 kilocycle/sec. pulse has a width of 500 milliseconds. This means that the gate 72 is opened and closed at the rate of 2 KHz and it remains open for only a 500 microsecond interval. Since, for the purpose of the operation of this system, the pulses applied to the input terminal 40 must be synchronized with the pulses applied to the terminal 77, it is contemplated that the 2 kilocycle/sec. signal will be derived by frequency division from one of the outputs of the divider 15. The same is true of the 250 microsecond pulses (400 kilocycles per second) applied to the terminal 41. Since the pulses are all synchronized, the pulse output from the inverter 71 is applied to the input of the gate 72 as a high signal at the same time that a high pulse is applied from the inverter 66. Thus, the output of the gate 72 goes low. However, since the output from the inverter 66 remains high only for 500 microseconds, at the end of that time, the gate 72 produces a high output. By the time the output from the inverter 66 again goes high, the output from the inverter 71 is low, and it remains low for 1 millisecond. By this means, the gate 72 generates a pulse which is 500 microseconds wide followed by a low output for 500 microseconds. The same operation is true of the gate 74 when the 250 microsecond pulses are applied to it from the terminal 41. Thus, at the output terminal 20 a train of eight pulses, each 250 microseconds wide and separated from its neighbor by 750 microseconds is generated.

The output from the terminal 20 of FIG. 3, in addition to being supplied as raw pulses for demonstration purposes, is also applied to the input of the rf phase coder 17. The phase coder 17 is shown in block and schematic form in FIG. 4. The pulses from terminal 20 are applied through a diode 82 and across a network formed of a resistor 84 in parallel with a diode 83, the arrangement in series with a capacitor 83, to ground. A resistor 86 connects the high end of the network to the base electrode of a transistor 88. The emitter electrode of the transistor 88 is connected through a resistor to a source of negative potential, and the collector electrode is connected through a load resistor 89 and a leak resistor 91 to the base electrode of a transistor 92. A source of positive potential is directly connected to the collector electrode of the transistor 92 and through a resistor 87 to the base electrode of the transistor 88. The emitter electrode of the transistor 92 is connected through a load resistor 90 to the source of negative potential and through a resistor 94 to the center tap of the coil of a parallel tuned circuit 93. The tuned circuit 93 is connected between ground the junction of the resistors 89 and 91. The emitter electrode of the transistor 92 is also directly connected to the base electrode of a gate transistor 96 whose collector electrode is directly connected to the source of positive potential. A resistor 95 connects the collector and base electrodes of the transistor 96 together. The emitter of the transistor 96 is connected to ground through the primary of a transformer 97, the secondary of which is shunted by a potentiometer 98 which has its moveable contact connected to ground. The secondary of the transformer 97 supplies energy to a single pole double throw switch 99 whose output is connected to an output terminal 18. A shift register 103 has the 1 kilocycle/sec. pulses generated by the pulse generator 14 applied to its shift input through the terminal 77. The shift register 103 is a 10-place shift register, and information may be applied to nine of its stages in parallel with the accepting signal coming from terminal 101. The Master Set signal is applied to an input terminal 27 which is connected to the input of the inverter 106 and to one input of a NAND gate 107 while the output of the inverter 106 is connected to the input of stage 7 of the register 103 and to one input of a gate 109. Also connected to the input of the inverter 106 and the gate 107 is the input of stage three of the shift register 103. One output from a binary counter stage 112 is directly connected to the other input of the gage 107, the input to stage six of the register 103, and through an inverter 111 to one input to a NAND gate 109. The output from the gate 109 is applied as one input to a NAND gate 108, the other input of which is connected to the output of the gate 107. The output from the gate 108 is connected to the inputs of stages four and eight of the shift register 103. The output from the shift register 103 is applied to the switch 99 as a control signal input.

Figure 4:
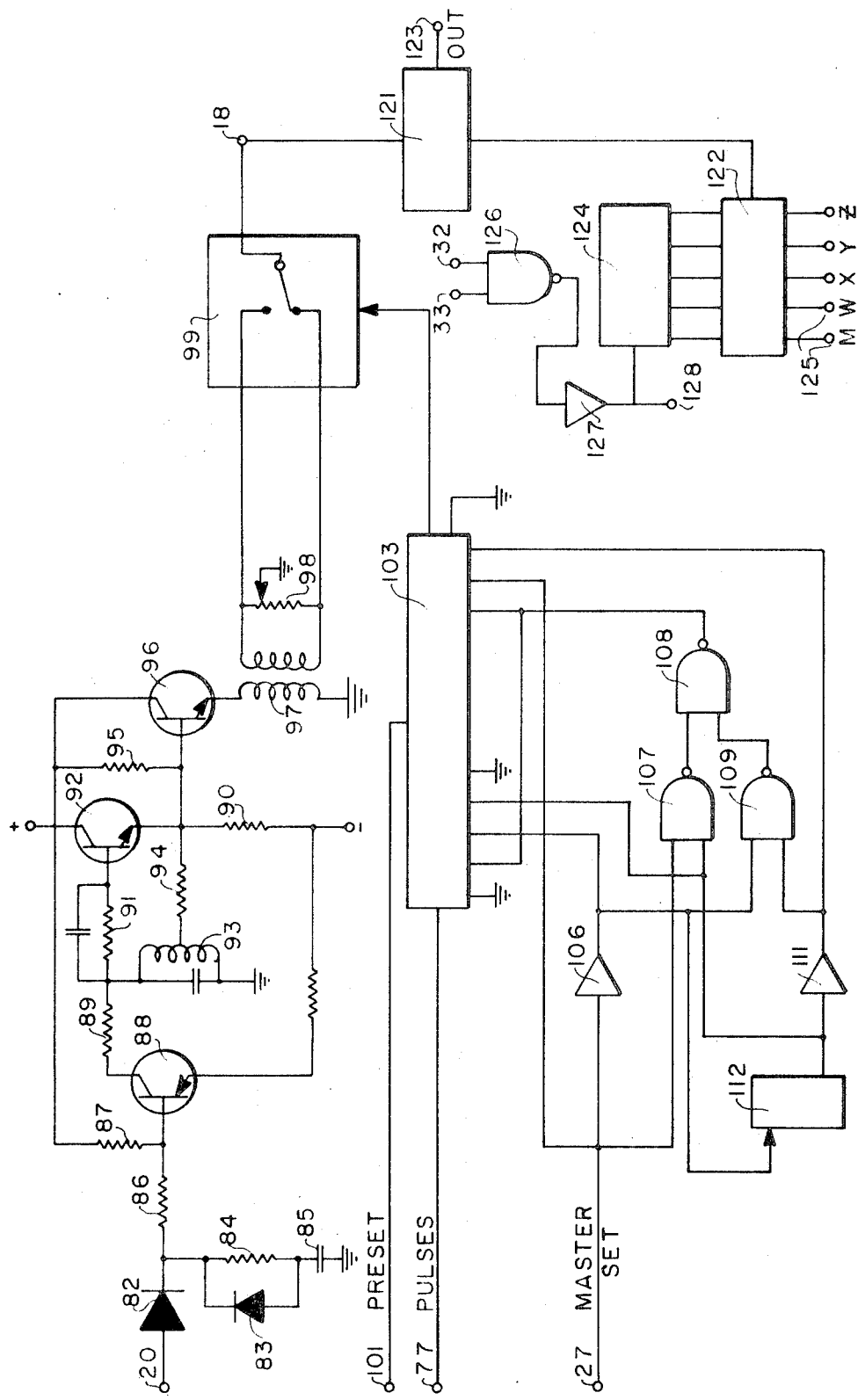
FIG. 4 is a block and schematic diagram of the radio frequency phase code of FIG. 1.

The apparatus shown in FIG. 4 provides radio frequency oscillations to simulate the radio frequency energy of the actual Loran C transmissions, it modulates that rf energy with the pulses generated by the Loran C generator shown in detail in FIGS. 2 and 3, and it initiates each of the modulated radio frequency pulses with the proper phase or polarity to match the phase coding of the actual Loran signals. The coding of the signals is fixed in four different formats: two formats for master pulses and two formats for slave pulses. In each case of the master and the slave pulse trains, one of the two formats is used for odd numbered transmissions and the other of the two formats is used for even numbered transmissions.

These codings are shown in the table below.

| Interval | Master | Slave X, Y, Z All Identical |
|---|---|---|
| 1 | M1++---+-+- | S1+++++---+ |
| 2 | M2+---+++++ | S2+-+-++-- |
| 3 | M1++---+-+- | S1+++++---+ |
| 4 | M2+---+++++ | S2+-+-++-- |

Odd transmissions from the master; that is, intervals 1, 3, 5, etc., are shown with the first half-cycle of each of the basic eight pulses being as follows: + + − − + − +  −. The even coding for the first half-cycle for each of the eight master pulses: + − − + + + + +. Similarly, the odd coding for the slave pulses is: + + + + + − − +, and the coding for the even slave pulses is: + − + − + + − −. These codings are fixed and alternate from one transmission to the next.

In FIG. 4, transistor 92 is connected with the tuned circuit 93 as a oscillator which oscillates at 10⁵ cycles per second. The oscillator is normally biased off by the transistor 88 which draws current from the source of positive potential through the collector-base path of the transistor 92, the resistor 89, and the resistor 91. This drives the base electrode of the transistor 92 negative, effectively cutting off conduction of that transistor. When a pulse is received at the input terminal 20, it drives the base electrode of the transistor 88 positive, cutting off the conduction of that transistor, and permitting the transistor 92 to conduct. The transistor 92 together with the parallel tuned circuit 93 and the base leak resistor 91 oscillates for the length of time that the pulse exists at the terminal 20. These high frequency oscillations are taken across the resistor 90 and applied to the gate transistor 96. To provide a steep wave front, the incoming pulses to the terminal 20 are shaped by the circuit comprising the resistor 84 and its parallel connected diode 82, and the series capacitor 85. The output from the power amplifier 92 appears across the primary of the transformer 97. A center-tapped potentiometer 98 causes the two sides of the secondary of the transformer 97 to be fixed on opposite sides of ground. The slide contact of the potentiometer 98 can be adjusted to balance the two sides of the output of the transformer 97. The two sides of the secondary of the transformer 97 are connected to the two sides of a single pole double throw switch 99, shown schematically by way of example as a mechanical double throw switch. However, a solid-state electronic variation of a single power double throw switch is preferred, since the switch must operate at high rates of speed. The output from the switch 99 is applied to the output terminal 18. When a pulse is received on the input terminal 20 and the oscillator 92 begins oscillating, one side of the secondary of the transformer 97 is positive at the beginning of the pulse, and the other side is negative at the same time. The double throw switch 99 selects which polarity the first half-cycle of the pulse will be. This selection is made by the output signal from the shift register 103.

The shift register 103 of FIG. 4 is a 10-place register that is arranged so that a pulse contained in any position in the register 103 represents a negative polarity signal encoding in the final radio frequency phase coded output. Thus, when the shift register 103 is set up to encode the eight pulses of a Loran C pulse train in accordance with the codes set forth in the above table, the contents of the register 103 are inverted from that shown in the table. Consider the master code M1. In order to produce at the terminal 18 an output which has the coding shown on the table for M1, positions number 1, 2, 5, and 7 of the register 103 have low signals inserted therein and positions number 3, 4, 6, and 8 have high signals inserted therein. To accomplish this coding, assume that the master set signal is applied to terminal 27 driving that terminal high, and assume that the counter 112 is in the restored condition so its output is high. From the terminal 27, a high signal is applied to the input of position three in the register 103, and a high signal is applied to one input of the gate 107. The output of the inverter 106 is low applying a low signal to the input of position seven of the register 103 and the low signal to one input of the gate 109. The output from the counter stage 112 is high applying a high signal to the sixth position of the register 103 and a high signal on the second input to the gate 107, driving the output of the gate 107 low. The output from the inverter 111 is low applying a low signal to the other input to the gate 109, and a low signal to the two position of the register 103. one input to the gate 108 is low from the gate 107 and the other input from the gate 109 is high driving the output of the gate 108 high and applying a high signal to the fourth and eighth positions of the register 103. Since, according to the table above, the number one and the number five positions of register 103 are always positive, these positions in the shift register 103 are grounded so that they always have low potentials applied to them. Before the pulse train appears on the clock terminal 77, a preset pulse is applied to the input terminal 101. This opens the shift register 103 so that the signals applied to the input lines are transferred therein. As the clock pulses applied to the terminal 77 appear at the shift register 103, the contents of that register are shifted one place toward the right for each clock pulse. When the contents of any position is shifted to the end position, which was not loaded, that signal appears on the output line which is applied as a control signal to the switch 99. Thus, as the eight pulses forming a standard Loran C pulse train are applied to the input of the shift register 103, the contents of that register are individually applied to control the switch 99. As specified above, when a pulse appears at the control input to the switch 99, that switch initiates the output pulse on a negative polarity half-cycle. Thus, the positive contents of the register 103 produce a negative polarity output at the terminal 18. The highest order to the shift register 107 is also grounded to provide for the ninth pulse of the master transmission. The official coding does not provide any special polarity for that signal so in this system it is considered positive. The first position of the shift register 103 is never loaded because its contents immediately appear on the line to the switch 99. Thus, as soon as something appears in that position, the switch 99 operates in accordance with that information, and if that is between pulse trains, then the first control signal is lost. So the register 103 is a 10-position register and the first position is not preloaded.

When the master signal appears at the terminal 27, it applies an input signal to the binary counter 112 changing its state. With the counters set in either state, the master and slave transmissions are generated and encoded. The next time the master set signal is applied to the input terminal 27, the state of the binary counter 112 is changed, and a second group of master and slave transmissions is generated. Assume now that the binary stage 112 remains in its restored condition, but that the master set signal has decayed from the terminal 27. The slave code S1 should now be generated. The terminal 27 is low placing a low signal in position three of the register 103 and a low signal onto an input of the gate 107. The output of the inverter 106 is high applying a high signal to the seven position of the register 103 and a high signal onto an input of the gate 109. The other signals remaining are a high signal at the output of the counter 112 which applies a high signal to the six position of the register 103 and a high signal to the other input of the gate 107. The output of the inverter 111 is low applying a low signal to the other input of the gate 109. Since each of the gates 109 and 107 has one high and one low input, the outputs from both gates are high, driving the output from the gate 108 low, and applying low signals to the number four and number eight positions of the shift register 103. The register 103 is now encoded with a word which will produce an output encoding of: + + + + + − − +. This is the S1 code. That code is applied to all of the slave transmissions for that interval and when the next master set signal is applied to the input terminal 27, the master code M2 is generated and produced at the output terminal 18.

In a Loran C transmission where a single master drives a plurality of slaves, the reception of those transmissions at a single receiver will have amplitudes which will vary with the distance of the individual master or slave transmitter from the receiver. The reception by the receiver of transmissions from the more distant transmitters not only will be delayed in time differently from those of the other transmitters, but there amplitudes will also be smaller. For realistic simulation of these signals, the amplitudes of the individual pulse trains must be controlled so that this variable amplitude condition is duplicated. The phase coded pulse trains applied to the output terminal 18 are also applied to a modulator 121 which is connected to an output terminal 123. The other input to the modulator 121 comes from an output of the multiplexer 122. Analog signals representative of the amplitudes of the individual pulse trains from the master and slave transmissions are applied to terminals 125 from the control device 13. The multiplexing inputs signals are applied to the multiplexer 122 from a counter 124. Terminals 32 and 33 to which are applied the $2^2$ signal and the $2^3$ counts from the counter 34 are connected to the input to a NAND gate 126 the output of which is applied to the input of an inverter 127. The output from the inverter 127 is connected to the count input of the counter 124.

Every time the counter 34 reaches a count of ten, the two output terminals 32 and 33 go high. This applies two high input signals to the gate 126 whose output is then low. This output, inverted by the inverter 27, applies a high input to the counter 124 which then counts. Each time the 10-pulse positions are generated and recorded by the counter 34, the counter 124 is stepped a count of one. The counter 124 is so constructed that it energizes a different output line for each count. Then, once the systems are synchronized, the counter 124 tracks the counter 34 and energizes a different input to the multiplexer 122 for each of the master and slave transmissions. The amplitude of the individual master and slave transmissions are determined by an instructor who sets them into the control device 13 and they are applied to the input terminals 125 of the multiplexer 122 at M, W, X, Y, and Z. Each time the counter 124 reaches a new count, a different amplitude signal is applied to the modulator 121. These signals modulate the trains of pulses applied to the modulator 121 from the terminal 18, and produce at the output terminal 123, trains of pulses which differ in amplitude in accordance with the information supplied from the control device 13.

What has been described above simulates the ground wave of the Loran C master and slave transmissions. The ground wave is that signal which radiates from the antenna and travels close to the surface of the earth in a generally straight line to the receiving antenna. In addition to the ground wave, however, sky waves are also received by the receiver. Sky waves are those portions of a transmission which radiate from the transmitter antenna at a rather steep angle with respect to the horizon, travel away from the earth's surface, and are reflected back by one or more layers of the ionosphere. Since the sky waves must travel to the ionosphere and then down to the antenna of the receiver, they travel much greater distances than do the ground waves. For this reason, the sky waves are usually received much later than the corresponding ground waves and this often produces "ghosts." The amplitudes of the received sky waves are also usually less than those of the ground waves. In a complete Loran trainer, provision must be made for simulating sky waves as well as ground waves so that the trainees can learn to distinguish between the two and obtain good navigational readings from the ground wave signals even in the presence of interfering sky wave signals. Apparatus for generating sky waves is shown in block form in FIG. 5.

Figure 5:
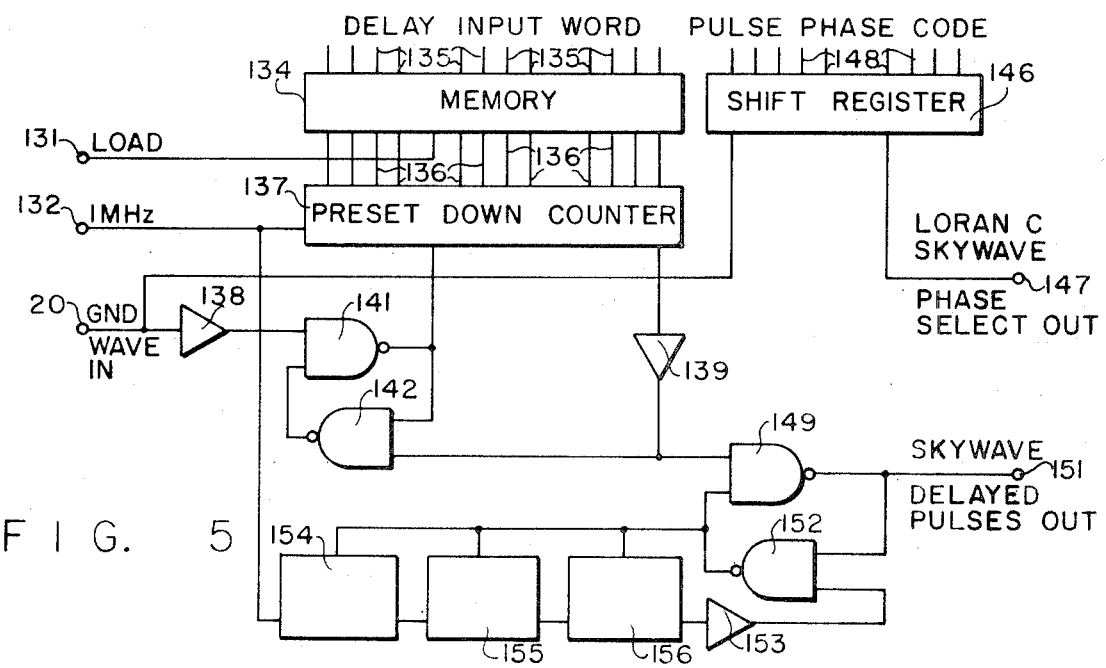
FIG. 5 is a block diagram of the skywave generator of the system of this invention.

The apparatus of FIG. 5 includes a memory device 134 which receives digital information in parallel from the control device 13 through input lines 135. A terminal 131 is connected to the gating input of the memory 134 and is adapted to receive a load input signal. The output from the memory 134 is taken in parallel along lines 136 which are connected to the parallel inputs of a preset counter 137. An input terminal 132 is connected to the count input of the counter 137 and is also adapted to be connected to a source of 1 MHz signals, which can be derived from the divider 15. The terminal 132 is also connected to the input of a first frequency divider 154 which is connected in series with a second divider 155 and a third divider 156. The output from the divider 156 is applied through an inverter 153 to one input of a NAND gate 152. The output from the NAND gate 152 is applied to one input of another NAND gate 149 and to an inhibit input of each of the dividers 154, 155, and 156. The output from the gate 149 is applied to the other input of the gate 152 and also to an output terminal 151 from which the sky wave delayed pulses are taken. An input terminal 20 which receives the Loran C output signals is connected to the input of an inverter 138, and also to the shift input of a shift register 146. The output from the inverter 138 is connected to one input of a NAND gate 141 whose output is connected to the inhibit input of the counter 137 and also to one input of a NAND gate 142. The output of the gate 142 is connected to the outer input of the gate 141. The other inputs to the gates 142 and 149 are connected to the output from the counter 137 through an inverter 139. The shift register 146 has a plurality of input lines 148 connected in parallel to the inputs of the shift register 103 in FIG. 4, and its output is connected to an input terminal 147 from which the sky wave phase select output of the system is acquired.

The system shown in FIG. 5 is very similar in its operation to the apparatus shown and described above for generating the ground wave signals. The memory 134 receives a delay word in parallel from the control device 13 and stores that word until it is utilized. The memory 134 could be included in the control device 13 or, in some systems, it could be eliminated entirely. At the end of a cycle of operation, the next delay word is made available to the input lines 135, and when the load control pulse indicating the initiation of a new cycle is applied to the input terminal 131, the information which is stored in the memory 134 is loaded into the counter 137 in parallel. In the meantime, the input terminal 132 is receiving pulses at the rate of 1 MHz. To prevent the counter 137 from counting these pulses until the proper time, the counter 137 is inhibited by the low output from the gate 141. When the output from the gate 141 is low, one input to the gate 142 is also low. This drives the output from the gate 142 high which applies one high input to the gate 141. Until a high pulse is applied to the input terminal 20, the output from the inverter 138 is normally high applying a high signal to the second input of the gate 141. The two high inputs on the gate 141 maintain the output from that gate low. In the meantime, the output from the inverter 139 has been high applying a high signal to the second input to the gate 142. This condition remains, and the counter 137 is thereby inhibited, until a ground wave signal is applied to the input terminal 20. When that occurs, the output from the inverter 138 goes low, driving the output from the gate 141 high and removing the inhibition from the counter 137. The counter 137 then begins counting the 1 MHz input pulses applied to the terminal 132. When the output from the gate 141 went high it applied a second high signal to the input of gate 142, driving its output low and latching the two gates in this condition even though the pulse applied to terminal 128 decays. As explained above in connection with the counter 12, the counter 137 may be either an up-counting or a down-counting counter. If a down-counting counter is used then, the word which actually defines the delay is inserted into the counter 137, and it counts the pulses applied to the terminal 132 until the counter 137 reaches zero. If an up-counting counter is used, then the complement of the word representing the actual delay is inserted into the counter 137, and the pulses arriving at the terminal 132 are counted until the counter 137 reaches its capacity and generates an overflow signal. In either case, when the end of the count is reached, the counter 137 generates a high output signal which is inverted by the inverter 139 and is applied to the inputs of the gates 142 and 149. The low output from the inverter 139 removes one of the high signals from the input of the gate 142 driving its output high and applying a second high input to the gate 141. That drives the output of the gate 141 low inhibiting the counter 137 until the next ground wave signal is applied to the terminal 128. In the meantime, the 1 MHz pulses applied to the input terminal 132 have also been directly applied to the input of the divider 154 whose output supplies the divider 156. These dividers can be in the form of counters which count down until the appropriate low count is reached at which time they generate an output signal. For every 400 pulses applied to the input of the divider 154 a single count output is applied to the input of the inverter 153 by the divider 156. Therefore, the output from the divider 156 is normally low placing a high signal on one of the inputs to the gate 152. At the same time, the output from the inverter 139 is normally high placing a high signal on the input of the gate 152. The output of the gate 152 is normally low. The output from the terminal 151 is the same as the input to the terminal 20 delayed by the amount of time represented by the number inserted in the counter 137. This is accomplished by the output signal from the counter 137 being applied through the inverter 139. When the counter 137 produces a high output signal, one input to the gate 149 is driven low driving the output terminal 151 high. That pulse at the output terminal 151 should exist for only 250 microseconds. To accomplish this, the divider comprising 154–156 produces an output signal when it reaches a count of 400. Since it is counting 1 MHz, this required 240 microseconds. When the count of 400 is reached, the input to the inverter 152 goes high, its output goes low, and the output from the gate 152 goes high. This applies a second high input signal to the gate 149, driving the level at the output terminal 151 low after it had been high for 250 microseconds. When the output from the divider 156 decays, the output of the inverter 153 goes high applying one high input signal to the gate 152. It remains in that condition until the next output from the counter 137. At that time, the output from the gate 149 again goes high placing two high inputs on the gate 152 and driving its output low. The high output from the gate 152 inhibits the operation of the divider 154–156 so that the divider is inhibited by its count output, and remains inhibited until the next output from the counter 137 appears. In this manner, no matter what the delay produced by the counter 137 may be, the start of the divider 154–156 always occurs with the production of the output signal by the counter 137.

The output at the terminal 151 is applied to a radio frequency oscillator (not shown) similar to that shown in FIG. 4, and it provides the modulating pulses for that oscillator in a manner similar to the way in which the pulses at the terminal 20 are applied to the oscillator of FIG. 4. The oscillator supplies energy to a single-pole double-throw switch (not shown) similar to that shown at 99 of FIG. 4. The control of that switch is derived from the shift register 147 in a manner similar to that achieved by the shift register 103 of FIG. 4. The shift register 146 receives its input code word from the encoding apparatus shown in FIG. 4 so that the sky waves and the ground waves of any single transmission have the same polarity and coding. This information is supplied to the shift register 146 through the lines 148. Each time an input signal is applied to the terminal 20, the shift register 146 is shifted one place to the right in the same way that the shift register 103 is shifted in FIG. 4. Whatever information appears in the number one position of the shift register 146 is applied to the output terminal 147. This drives the double-throw single-pole switch to phase code the sky waves in the same manner in which the ground waves are encoded in FIG. 4.

Figure 6:
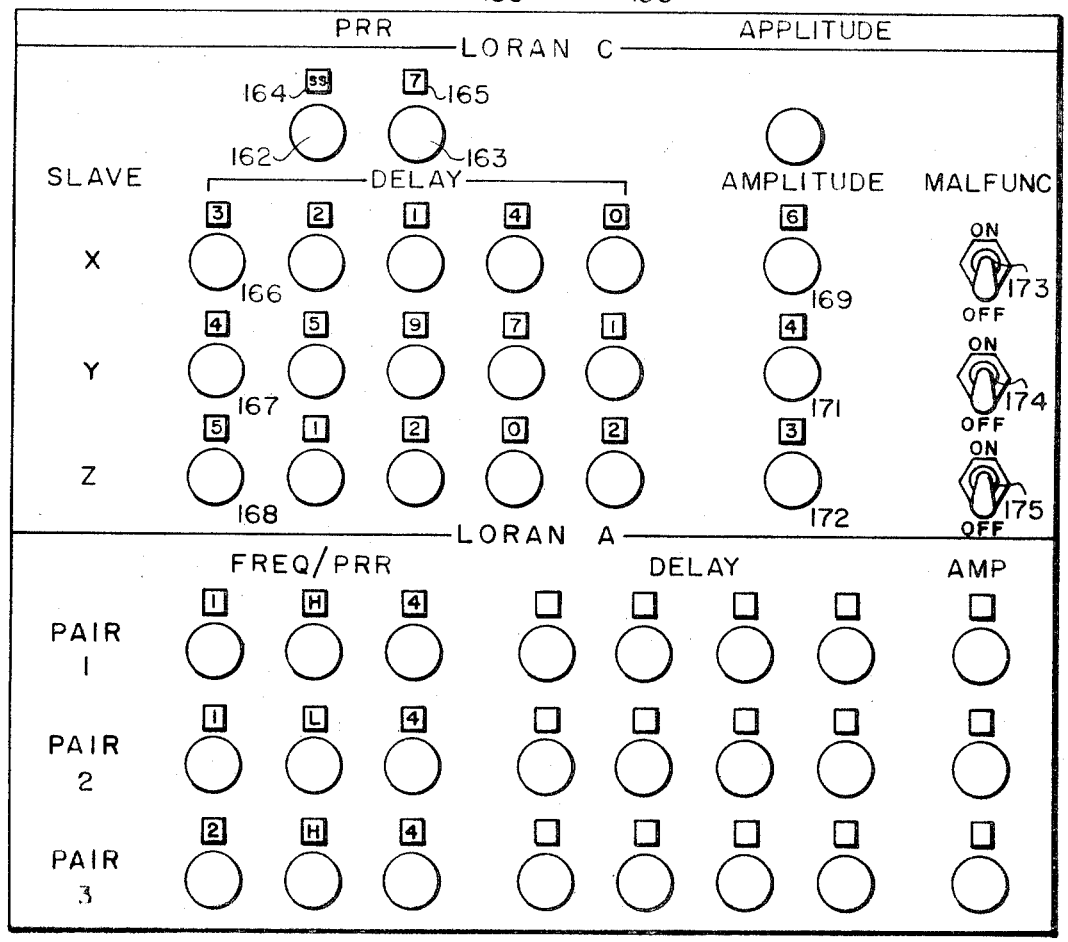
FIG. 6 is an elevational view of a control device of the system of this invention.

As mentioned above, control device 13 may be a digital computer which is programmed to perform navigational computations and thereby to generate digital words representing the delays. This is accomplished in a computer by repeatedly recomputing the position of a receiver as it moves through a gaming area with respect to the fixed, known positions of the several master and slave transmitters. Since this type of computation is old and is performed by digital computers in large numbers of navigational training systems, there is no necessity to discuss it in detail herein. An alternative to a digital computer for the device 13 can be manually operable apparatus such as shown schematically in FIG. 6. This apparatus comprises a panel board 161 having mounted thereon a plurality of switch control knobs such as 162, 163, 166, 167, 168, 169, 171, and 172. Each knob has associated with it a window such as those shown at 164 and 165. Also included are single-pole single-throw switches such as 173, 174, and 175. The knobs and switches are arranged in banks with appropriate labels so that they may be readily operated by an instructor or operator. There is nothing new in the construction and operation of a panel such as that shown in FIG. 5, and its detailed description will be despensed with. The following description is included to complete the description of the apparatus of this invention so that those skilled in the art will be enabled to construct and use them.

The knobs 162, 163, and 166–172 are connected to the shafts of suitable rotary switches. The rotary switches may be of any suitable construction for this purpose. They may comprise any suitable number of decks, and may include any suitable number of contacts on each deck. The contacts on the various decks are wired to appropriate electrical components to produce the desired output information. Consider, for example, knob 166, which represents the control which determines one shift delay word for the first slave. The delay word comprises 20 binary digits, and each digit can be either a high potential or a low potential. Therefore, for each position of the rotary switch in location 166, a single 20-bit word is produced. One manner in which this can be accomplished is to have a single rotary switch with 20 decks. Assuming, that each switch would be capable of producing 10 output words, then a single 20-deck switch should include 10 contacts per deck. These contacts may be wired so as to provide a high or low signal for each of the digit positions. Another way in which this can be accomplished is for each switch to produce a single 20 bit word. In each case then, each switch could comprise a smaller number of decks so that the smallest number of contacts is 20, and each contact could or could not be connected to a source of potential so that the output from the switch would produce the desired binary word. Switches of this type for this purpose are shown in more detail in FIG. 2P of U.S. Pat. No. 3,514,521 to Burchare et al. By providing a plurality of such switches for each slave transmitter (five are shown for each of X, Y, and Z slaves in FIG. 5), these delays could represent a single combination of one ground wave and four sky waves, or any other such combination desired. The instructor turns the knob to the appropriate switch position and the desired delay is automatically generated. The same situation is true with respect to the selection of relative amplitudes of the individual slave transmissions. In addition, the switches 173–175 permit the instructor to insert or delete a malfunction in any of the slave transmissions. Similar switches can be included for the master or for four slaves if desired. Switches 173–175 are simple switches with are either open or closed to supply steady voltages when closed.

The apparatus described above in connection with FIG. 5 is a simple and inexpensive device, but it has limited capacities. It is admirably suited when used in connection with the rest of the apparatus of this invention as a simple classroom aid for familiarizing a class of trainees with the operation of Loran equipment. A computer controlled apparatus can be used to run complete problems, particularly as part of an entire training complex, in which navigational problems are run in conjunction with radar and other simulators. An intermediate form of control device could use a panel similar to that shown in FIG. 5 in conjunction with a fixed storage device in which a plurality of delay words is inserted. The number of delay words could be rather limited, and the size of the memory kept small. In that type of apparatus each position of each switch on the panel could be connected to the memory location of one delay word. If each switch was a 10-position switch, in one form of the apparatus, only 10 memory locations need be required to store ten different delay words. Each switch could be set to one of those 10 addresses. In another form, there could be a separate memory address for each switch position of each of the rotary switches on the panel 161. The contents of those addresses could be loaded by any suitable means prior to the initiation of any class and the instructor could then have, literally at his fingertips, all of the delays available by the mere rotation of knobs. The windows, such as 164 and 165, are provided to shown the position of any switch at any time. In any case, the control device 13 is usually under the direct control of an instructor who operates the switches and other controls to select the delays and the initial operating conditions. In any form of control device 13, the instructor should have the capabilities to add or delete malfunctions and the like. Switches such as 173–175 provide this capability. Other such means could be used.

The above specification has described a new and improved apparatus for training students in the use and operation of Loran C equipment. Mention has been made of Loran A equipment, but that is a mere adjunct to the apparatus described above. The system of this invention includes means for the generation of realistic Loran C signals which selectable time differences in reception for direction application to standard Loran receivers. In use, the student operates the actual equipment he will be expected to use on his job, and that equipment is supplied by the apparatus of this invention with realistic signals to provide the student with effective training. It is realized that the above description may suggest to others skilled in the art additional ways in which the apparatus of this invention may be used without departing from its principles. It is, therefore, intended that this application be limited only by the scope of the appended claims.

What is claimed is:

1. Apparatus for training navigators in the use of navigational equipment designed to indicate the position of a receiver which receives the transmission from several transmitters whose locations are precisely known, said apparatus comprising means for generating signals which simulate the transmission from the transmitters, and receivers for comparing several of said simulated transmissions; said generating means comprising a source of electrical pulse trains, which pulse trains are separated in time by intervals whose length is dependent upon the simulated position of said receiver with respect to said simulated transmitters; means for producing selected time intervals comprising a counter, means for loading said counter with a number whose value is proportional to the time interval to be produced, a clock for generating fixed frequency clock pulses, and means for connecting the output from said clock to the input to said counter to drive said counter through its count from the value of the number loaded therein so that said counter generates an output signal when it reaches the end of its count; a pulse generator responsive to the output from said counter to generate a prescribed number of output pulses; a source of high-frequency energy; a modulator; means for connecting the outputs from said source of high-frequency energy and said pulse generator to the inputs of said modulator so that said modulator produces at its output pulses of high-frequency energy; means for determining the polarity of the first cycle of high-frequency energy in each of said pulses of high-frequency energy in accordance with a prescribed schedule; and means for applying the output of said determining means to a navigation receiver where it is compared with the outputs of other similar determining means.

2. The apparatus defined in claim 1 further including gating means interposed between said clock and said counter, and means for connecting selected outputs from said counter to said gating means to inhibit the passage of pulses through said gating means when said counter reaches prescribed counts.

3. Apparatus for driving a Loran C receiver to simulate the reception of Loran C transmissions, said apparatus comprising means for generating trains of pulses representing both master and slave transmissions, said generating means comprising a source of electrical pulses, a chain of gating means connected in series with each other with the output of one gate serving as one input to the next gate, means for applying the output of said source of pulses to the input to the first gate in said chain of gates, a counter, means for applying the output from said source of pulses to the count input of said counter, means for connecting individual count outputs from said counter to individual inputs to said gates to control the passage through said gates of individual pulses from said source, an interval timer, and means for applying the output from said interval timer to the inputs of gates in said chain of gates to prevent the passage of pulses therethrough except at appropriate selected intervals of time.

4. The apparatus defined in claim 3 wherein said chain of gates comprises NAND gates followed by signal inverters.

5. The apparatus defined in claim 3 wherein said interval timer comprises a counter, a control means for supplying a digital value to said counter, means for connecting the output of said source of pulses to the input of said counter so that said counter counts said pulses starting with the value it receives from said control means, said counter generating an output signal when its count reaches the capacity of said counter, and means connected to the output of said counter for interrupting further counting by said counter when said counter produces an output signal.

6. The apparatus defined in claim 5 further including means for generating a radio frequency signal, means for modulating said radio frequency signal by the pulse train generated by said generator, and means for controlling the polarity of the first half-wave of each pulse of radio frequency energy.

7. The apparatus defined in claim 6 wherein said means for controlling polarity comprises a single-pole double-throw switch, means for controlling said switch, and means for applying to the two positions of said switch opposite polarities of said modulated pulse.

8. The apparatus defined in claim 7 wherein said switch control means comprises a shift register, means for inserting into said shift register a digital word representative of the polarities of the pulses in a train of pulses, each digit of said word representing the polarity of the first half-wave of a pulse in said train of pulses, means for causing the contents of said register to shift to a new position when a new pulse is to be applied to said switch, and means for applying the digit in a selected digit position of said register to the control input of said switch to control the throw of said switch.

9. The apparatus defined in claim 8 further including means for controlling the amplitude of the output from said switch, said amplitude control means comprising a multiplexing means, means for applying to said multiplexing means a plurality of amplitude control signals, an amplitude modulator connected to the output of said switch means, means for connecting the output of said multiplexing means to said modulator, and means for selecting which of said amplitude control signals is applied to said modulator at any time.

* * * * *